United States Patent
Al-Abdullatef et al.

(10) Patent No.: US 11,545,851 B2
(45) Date of Patent: Jan. 3, 2023

(54) SYSTEMS, METHODS, AND APPARATUSES FOR DISTRIBUTING BACKUP ELECTRICAL POWER

(71) Applicant: Saudi Arabian Oil Company, Dhahran (SA)

(72) Inventors: Abdulaziz K. Al-Abdullatef, Tanajib (SA); Abdullah Y. Al-Hassan, Tanajib (SA); Rami A. Al-Ghanim, Tanajib (SA); Abdullah A. Al-Taezi, Tanajib (SA)

(73) Assignee: Saudi Arabian Oil Company, Dhahran (SA)

( * ) Notice: Subject to any disclaimer, the term of this patent is extended or adjusted under 35 U.S.C. 154(b) by 11 days.

(21) Appl. No.: 16/989,417

(22) Filed: Aug. 10, 2020

(65) Prior Publication Data
US 2022/0045547 A1 Feb. 10, 2022

(51) Int. Cl.
*G05B 19/042* (2006.01)
*H02J 9/06* (2006.01)
(Continued)

(52) U.S. Cl.
CPC .............. *H02J 9/06* (2013.01); *F24F 11/46* (2018.01); *G05B 19/042* (2013.01); *H02J 13/00032* (2020.01); *G05B 2219/2614* (2013.01)

(58) Field of Classification Search
None
See application file for complete search history.

(56) References Cited

U.S. PATENT DOCUMENTS 6,813,897 B1 * 11/2004 Bash .................. G06F 1/206
62/175
7,514,815 B2 4/2009 Paik et al.
(Continued)

FOREIGN PATENT DOCUMENTS

TW          I550987          9/2016

OTHER PUBLICATIONS

SAES-T-151, D.C. Power Systems, Saudi Aramco Engineering Standard, Apr. 2012, 13 pages.
(Continued)

*Primary Examiner* — Jason Lin
(74) *Attorney, Agent, or Firm* — Fish & Richardson P.C.

(57) ABSTRACT

In an example method, a power management system receives sensor data regarding an operation of a primary power source, a secondary power source, an environmental regulation system, and a plurality of electrically-powered sub-systems. Further, the system receives a plurality of parameter sets for the sub-systems, each including a first parameter indicting a priority of a respective sub-system relative to the other sub-systems, a second parameter indicating an amount of heat dissipated by the respective sub-system during operation, and a third parameter indicating a temperature requirement associated with the respective sub-system. The system controls, based on the sensor data and the parameter sets, a delivery of electrical power from the primary and secondary power sources to the environmental regulation system and the sub-systems. Further, the system controls, based on the sensor data and the parameter sets, a consumption of electrical power by the environmental regulation system and the sub-systems.

21 Claims, 5 Drawing Sheets

(51) Int. Cl.
*F24F 11/46* (2018.01)
*H02J 13/00* (2006.01)

(56) References Cited

U.S. PATENT DOCUMENTS

| | | | |
|---|---|---|---|
| 8,195,340 B1 | 6/2012 | Haney et al. | |
| 8,674,823 B1 * | 3/2014 | Contario | G01R 19/145 |
| | | | 340/538 |
| 8,751,836 B1 * | 6/2014 | Piszczek | G06F 1/3268 |
| | | | 713/300 |
| 8,924,781 B2 * | 12/2014 | Shaw | G06F 1/30 |
| | | | 714/14 |
| 9,337,663 B2 | 5/2016 | Alberth et al. | |
| 9,397,520 B2 | 7/2016 | Redpath et al. | |
| 9,735,613 B2 | 8/2017 | Orthlieb et al. | |
| 9,755,384 B2 | 9/2017 | Bury et al. | |
| 10,020,656 B2 | 7/2018 | Saussele et al. | |
| 10,082,857 B1 * | 9/2018 | Czamara | G06F 9/5094 |
| 10,840,735 B1 * | 11/2020 | Cooper | H02J 3/32 |
| 2005/0028017 A1 * | 2/2005 | Janakiraman | G06F 1/263 |
| | | | 713/340 |
| 2005/0203761 A1 | 9/2005 | Barr et al. | |
| 2006/0260335 A1 * | 11/2006 | Montuoro | H02J 3/32 |
| | | | 62/236 |
| 2009/0230772 A1 * | 9/2009 | Caudill | H02J 3/46 |
| | | | 307/44 |
| 2011/0133559 A1 * | 6/2011 | Yamashita | G06F 1/30 |
| | | | 307/66 |
| 2012/0091804 A1 * | 4/2012 | Altonen | H04L 12/413 |
| | | | 307/31 |
| 2015/0270743 A1 * | 9/2015 | Orthlieb | H02J 3/00 |
| | | | 165/288 |
| 2018/0116070 A1 * | 4/2018 | Broadbent | H02J 4/00 |
| 2021/0034130 A1 * | 2/2021 | Guim Bernat | G06F 1/28 |
| 2021/0083505 A1 * | 3/2021 | Beaston | H02J 9/06 |

OTHER PUBLICATIONS

SAES-P-103, UPS and DC Systems, Saudi Aramco Engineering Standard, Oct. 2008, 42 pages.
PCT International Search Report and Written Opinion in International Appln. No. PCT/US2021/045192, dated Nov. 22, 2021, 13 pages.

* cited by examiner

SYSTEMS, METHODS, AND APPARATUSES FOR DISTRIBUTING BACKUP ELECTRICAL POWER

TECHNICAL FIELD

The disclosure relates to systems and techniques for distributing backup electrical power.

BACKGROUND

Electrical power can be distributed to one or more systems using an electrical grid, such as an electrical grid provided by a public utility or a private entity. In some circumstances, the electrical power provided by the electrical grid may be insufficient to power the one or more systems. For example, the electrical grid may suffer from a malfunction that temporarily impairs its ability to supply electrical power to the one or more systems. As another example, the electrical grid may experience a surge in demand for electrical power that exceeds its ability to supply electrical power. In response, a standby power generation system or battery can be used to supply backup electrical power to the one or more systems on a temporary basis, such that the one or more systems can continue to operate.

SUMMARY

Systems and techniques for distributing electrical power are described in this disclosure. In an example implementation, a power management system controls the distribution of electrical power to one or more electrically powered sub-systems, such as environmental regulation systems, computer systems, telecommunications systems, or any other system that operates using electrical power. For instance, the power management system can distribute electrical power supplied by one or more primary power sources (such as an electrical grid provided by a public utility or private entity) to each of the sub-systems. If this electrical power is insufficient to power the sub-systems, the power management system can distribute backup electrical power supplied by one or more secondary power sources (such as a standby power generation system) to at least some of the sub-systems on a temporary basis.

Further, during an outage in the primary power source, the power management system can prioritize the distribution of backup electrical power to certain sub-systems over others. Further, the power management system can selectively control the operation of each of the sub-systems based on the characteristics of each of the sub-systems, such as the amount of electrical power that they draw during operation and the amount of heat that they dissipate into the ambient environment. Further, the power management system can selectively control the operation of each of the sub-systems to account for particular operating requirements of each of the sub-systems, such as power requirements or temperature requirements. Further, the power management system can selectively reduce the electrical power consumed by the sub-systems, such that the run time of the sub-systems under the backup electrical is increased.

The implementations described in this disclosure can provide various technical benefits. As an example, a power management system enable electrically powered sub-systems to continue their operation, even despite outages in a primary power source. Further, the power management system can prioritize the distribution of electrical power to certain sub-systems over others. Accordingly, sub-systems that are more important to particular users or entities are more likely to continue their operation, even if the backup electrical power is insufficient to sustain the operation of each and every sub-system concurrently. Further, the power management system can increase the run time of the sub-systems under backup electrical power, such that their operations are less susceptible to interruption even despite prolonged outages in the primary power source.

In an aspect, a method includes receiving, by a power management system, sensor data regarding an operation of a primary power source, a secondary power source, an environmental regulation system, and a plurality of electrically-powered sub-systems; receiving, by the power management system, a plurality of parameter sets for the sub-systems, where each of the parameter sets includes first parameter indicting a priority of a respective sub-system relative to the other sub-systems, a second parameter indicating an amount of heat dissipated by the respective sub-system during operation, and a third parameter indicating a temperature requirement associated with the respective sub-system; controlling, by the power management system based on the sensor data and the parameter sets, a delivery of electrical power from the primary power source and the secondary power source to the environmental regulation system and the sub-systems, and controlling, by the power management system based on the sensor data and the parameter sets, a consumption of electrical power by the environmental regulation system and the sub-systems.

Implementations of this aspect can include one or more of the following features.

In some implementations, the primary power source can be an electrical grid, and secondary power source can include at least one of a standby power generation system or a battery.

In some implementations, the environmental regulation system can include a heating, ventilation and air conditioning (HVAC) system.

In some implementations, controlling the consumption of electrical power by the environmental regulation system and the sub-systems can include modifying a temperature setting of the environmental regulation system.

In some implementations, modifying the temperature setting of the environmental regulation system can include increasing the temperature setting of the environmental regulation system.

In some implementations, controlling the consumption of electrical power by the environmental regulation system and the sub-systems can include selecting a subset of the sub-systems, and reducing a consumption of electrical power by the subset of the sub-systems.

In some implementations, reducing the consumption of electrical power by the subset of the sub-systems can include switching off the subset of the sub-systems.

In some implementations, the subset of the sub-systems can be selected based on one of the first, the second, or the third parameters of each of the sub-systems.

In some implementations, the subset of the sub-systems can be selected based on a combination of the first, the second and the third parameters of each of the sub-systems.

In some implementations, controlling the consumption of electrical power by the environmental regulation system and the sub-systems can include determining, based on the sensor data, an interruption of electrical power supplied by the primary power source; determining, based on the data, that electrical power supplied by the secondary power source is sufficient to operate the environmental regulation system; and responsive to determining the interruption of electrical power supplied by the primary power source and determining that electrical power supplied by the secondary power source is sufficient to operate the environmental regulation system, performing at least one of: increasing a temperature setting of the environmental regulation system, or reducing a consumption of electrical power by a subset of the sub-systems.

In some implementations, the subset of the sub-systems can be selected based on the first parameters of each of the sub-systems.

In some implementations, controlling the consumption of electrical power by the environmental regulation system and the sub-systems can include determining, based on the sensor data, an interruption of electrical power supplied by the primary power source; determining, based on the data, that electrical power supplied by the secondary power source is not sufficient to operate the environmental regulation system; and responsive to determining the interruption of electrical power supplied by the primary power source and determining that electrical power supplied by the secondary power source is not sufficient to operate the environmental regulation system, reducing a consumption of electrical power by a subset of the sub-systems.

In some implementations, the subset of the sub-systems can be selected based on one of the first, the second, or the third parameters of each of the sub-systems.

In some implementations, the subset of the sub-systems can be selected based on a combination of the first, the second and the third parameters of each of the sub-systems.

In some implementations, controlling the consumption of electrical power by the environmental regulation system and the sub-systems can include determining, based on the sensor data, a malfunction in the environmental regulation system; and responsive to determining the malfunction in the environmental regulation system, reducing a consumption of electrical power by a subset of the sub-systems.

In some implementations, the subset of the sub-systems can be selected based on one of the first, the second, or the third parameters of each of the sub-systems.

In some implementations, the subset of the sub-systems is selected based on a combination of the first, the second and the third parameters of each of the sub-systems.

In some implementations, the sub-systems can include at least one of: one or more computer systems, or one or more telecommunications systems.

In some implementations, each of the parameter sets can include at least one of: a fourth parameter indicting a number of users of the respective sub-system, a fifth parameter indicating a location of the respective sub-system, or a sixth parameter indicating a type of service provided by the respective sub-system.

In some implementations, the sensor data can include at least one of: an indication of an amount of electrical power provided by the primary power source, an indication of an amount of electrical power provided by the secondary power source, an amount of electrical power consumed by the environmental regulation system, or an amount of electrical power consumed by the plurality of electrically-powered sub-systems.

In some implementations, the sensor data can include an indication of a temperature of an environment of the sub-systems.

In some implementations, the method can further include receiving, by the power management system from a computer system, a modification to at least one parameter set of the plurality of parameter sets, the modification being specified by a human operator; and controlling, by the power management system based on the modification, the consumption of electrical power by the environmental regulation system and the sub-systems.

In some implementations, the method can further include receiving, by the power management system from a computer system, a command regarding an operation of the environmental regulation system and the sub-systems, the command being specified by a human operator; and controlling, by the power management system, the consumption of electrical power by the environmental regulation system and the sub-systems in accordance with the command.

Other implementations are directed to systems, devices, and devices for performing some or all of the method. Other implementations are directed to one or more non-transitory computer-readable media including one or more sequences of instructions which when executed by one or more processors causes the performance of some or all of the method.

The details of one or more embodiments are set forth in the accompanying drawings and the description. Other features and advantages will be apparent from the description and drawings, and from the claims.

DETAILED DESCRIPTION

Figure 1:
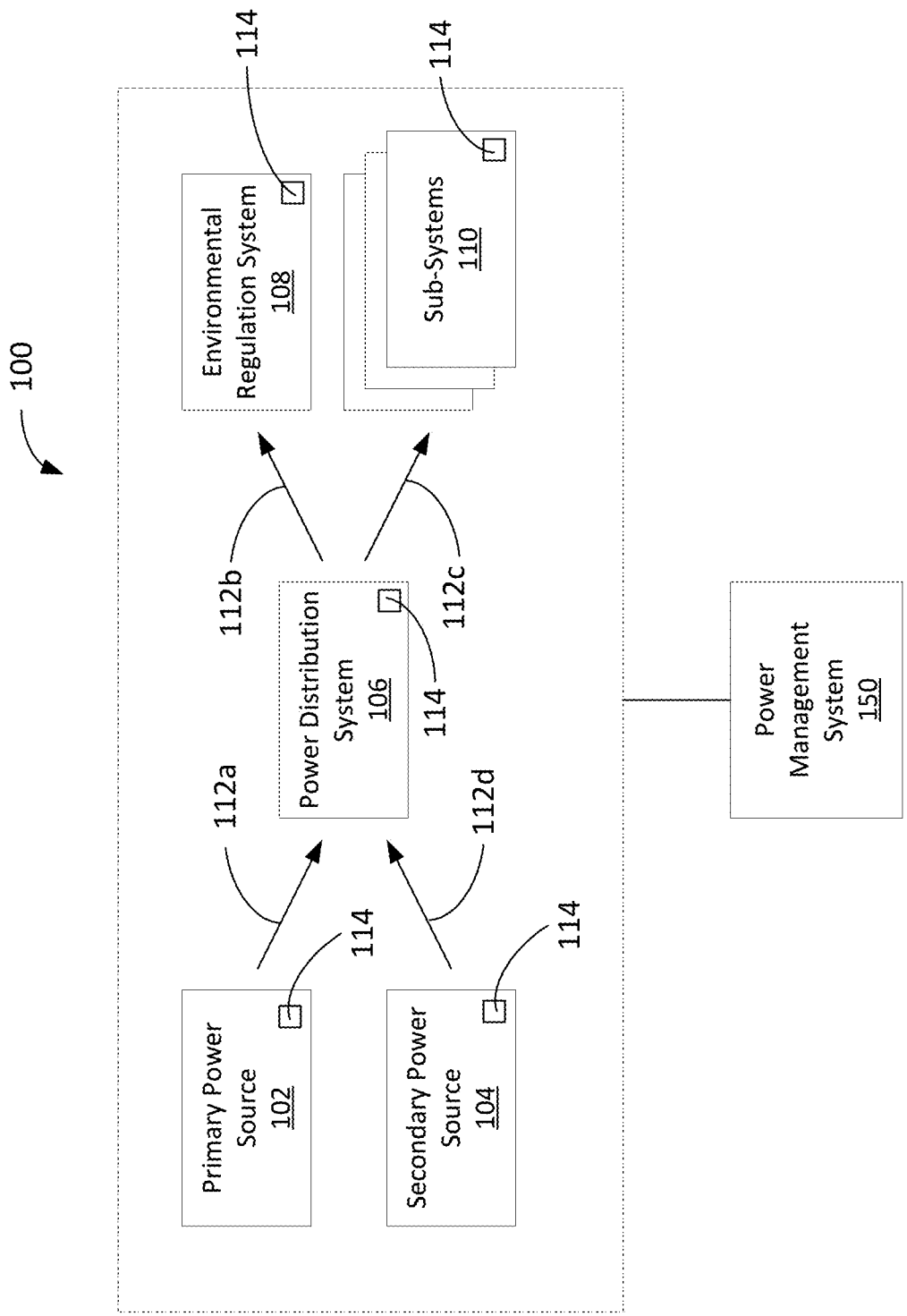
FIG. 1 is a diagram of an example electrically-powered system.

An example electrically powered system 100 is shown in FIG. 1. The system 100 includes a primary power source 102, a secondary power source 104, a power distribution system 106, an electrically powered environmental regulation system 108, additional electrically powered sub-systems 110, and a power management system 150. During an example operation of the system 100, the power management system 150 regulates a distribution of electrical power from the primary power source 102 and the secondary power source 104 to the environmental regulation system 108 and the sub-systems 110.

As an example, the primary power source 102 can supply electrical power to the power distribution system 106, such as through one or more electrical supply lines 112a. In some implementations, the primary power source 102 can be an electrical grid, such as an electrical grid provided by a public utility or a private entity. For example, the primary power source 102 can include on one or more power generation systems (such as thermal power stations, renewable energy power stations, any other systems that generate electrical power, or any combination thereof). Further, the primary power source 102 can include infrastructure for conveying the electrical power generated by the power generation systems to other locations. In some implementations, the primary power source 102 may be referred to as a "utility power source" or a provider of "utility power." In some implementations, the electrical supply lines 112a can include one or more electrically conductive wires or cables that electrically couple the primary power source 102 to the power distribution system 106.

The power distribution system 106 receives the electrical power and distributes at least some of the electrical power to the environmental regulation system 108 and the other sub-systems 110 via respective electrical supply lines 112*b* and 112*c*. As an example, the power distribution system 106 can include one or more relays, switches, or distributors that route electrical power to the environmental regulation system 108 and the sub-systems 110. In some implementations, the electrical supply lines 112*b* and 112*c* can include one or more electrically conductive wires or cables that electrically couple the power distribution system 106 to the environmental regulation system 108 and the sub-systems 110, respectively.

The environmental regulation system 108 controls one or more characteristics of an environment using the electrical power. For example, the environmental regulation system 108 can include one or more heating, ventilation and air conditioning (HVAC) systems that control a heating of a particular environment, a cooling of a particular environment, a humidity of a particular environment, an air circulation of a particular environment, a ventilation of a particular environment, any other characteristics of a particular environment, or any combination thereof. In some implementations, the environmental regulation system 108 can control an environment of one or more of the sub-system 110. For example, at least some of the sub-systems can be located in a particular room or building, and the environmental regulation system 108 can control the condition of the environment within that room or building.

Each of the sub-systems 110 is configured to perform one or more respective operations using the electrical power. For example, the sub-systems 110 can include one or more computer systems, telecommunications systems, lighting systems, manufacturing or industrial systems, any other system that operates using electrical power, or any combination thereof. In some implementations, at least some of the sub-systems 110 can be located in one or more data centers or other such facilities.

During operation of the system 100, in some circumstances, the electrical power provided by the primary power source 102 may be insufficient to power each of the environmental regulation system 108 and the sub-systems 110 concurrently. For example, the primary power source 102 may suffer from a malfunction that temporarily impairs its ability to supply electrical power to the power distribution system 106. As another example, the primary power source 102 may experience a surge in demand for electrical power that exceeds its ability to supply electrical power.

To mitigate disruptions in the operation of the environmental regulation system 108 and the sub-systems 110, the secondary power source 104 can supply backup electrical power to the power distribution system 106 on a temporary basis, such as through one or more electrical supply lines 112*d*. In some implementations, the secondary power source 104 may be referred to as a "backup power source" or an "emergency power source." In turn, the power distribution system 106 can distribute at least some of the backup electrical power to one or more of the environmental regulation system 108 and the sub-systems 110 (such as using one or more switches, relays, or distributors). Accordingly, at least some of the environmental regulation system 108 and the sub-systems 110 can continue to operate, even if there is an outage in the primary power source 102.

In some implementations, the electrical supply lines 112*d* can include one or more electrically conductive wires or cables that electrically couple the secondary power source 104 to the power distribution system 106.

In some implementation, the secondary power source 104 can include one or more emergency power generators, such as generators that convert a supply of gasoline or other fuel into electrical power. In some implementations, the secondary power source 104 can include one or more stores of electrical power, such as batteries, capacitors, or fuel cells. In some implementations, the secondary power source 104 may be operated by the same entity or entities that operate the environmental regulation system 108 and the sub-systems 110, whereas the primary power source 102 is operated by a different entity, such as a public utility.

In some implementation, the secondary power source 104 may have a particular finite capacity for generating electrical power, after which it may become depleted. For example, in some implementation, the secondary power source 104 can be configured to supply a particular amount of current at a particular voltage for a particular amount of time, after which the secondary power source 104 is depleted. The secondary power source 104 can be refueled or recharged to continue its operation.

The power management system 150 can monitor and control the operation of some or all of the components of the system 100. For instance, the power management system 150 can obtain sensor measurements from one or more sensors 114 distributed about the system 100. The sensor measurements can be collected continuous, periodically, or intermittently over time.

As an example, the sensor measurements can include data regarding the operation of the primary power source 102. This data can include the amount of electrical power that is being supplied by the primary power source 102 to the power distribution system 106, the current the supplied electricity, the voltage of the supplied electricity, or any other characteristic.

As another example, the sensor measurements can include data regarding the operation of the secondary power source 104. This data can include the amount of electrical power that is being supplied by the secondary power source 104 to the power distribution system 106, the current of the supplied electricity, the voltage of the supplied electricity, or any other characteristic. In some implementations, the data can also include the maximum amount of electrical power that can be supplied by the secondary power source 104 (for example, a maximum capacity of the secondary power source 104). In some implementations, the data can include the remaining amount of electrical power that can be supplied by the secondary power source 104 before it is depleted (for example, the remaining capacity of the secondary power source 104).

As another example, the sensor measurement can include data regarding the operation of the environmental regulation system 108. This data can include the amount of electrical power that is being consumed by the environmental regulation system 108, the current of the electricity supplied to the environmental regulation system 108, the voltage of the electricity supplied to the environmental regulation system 108, or any other characteristic. In some implementations, the data can include an operational status of the environmental regulation system 108. For example, the data can indicate whether it is functioning or malfunctioning, or whether it is switched on or off. As another example, the data can indicate the operatizing speed of one or more of the components of the environmental regulation system 108, such as fans. In some implementations, the data can include a current condition of the environment that is being regulated by the environmental regulation system 108, such as the temperature, the humidity, the air flow, or any combination thereof. In some implementations, the data can include a target condition of the environment that is being regulated by the environmental regulation system 108, such as a target temperature, a target humidity, a target air flow, or any combination thereof.

As another example, the sensor measurement can include data regarding the operation of each of the sub-systems 110. This data can include the amount of electrical power that is being consumed by each of the sub-systems 110, the current of the electricity supplied to each of the sub-systems 110, the voltage of the electricity supplied to each of the sub-systems 110, or any other characteristic. In some implementations, the data can include an operational status of the each of the sub-systems 110, such as whether it is functioning or malfunctioning.

As another example, the sensor measurement can include data regarding the operation of the power distribution system 106. This data can include information regarding the characteristics of the electricity received by the power distribution system, such as the power, current, and voltage. This data can include information regarding how the electricity is distributed to each of the environmental regulation system 108 and the sub-systems 110. For example, the data can indicate the amount of electrical power that is being distributed to each of the environmental regulation system 108 and the sub-systems 110, the source of that electrical power, and the current and voltage of the electricity that is supplied to each.

Using these sensor measurements, the power management system 150 can distribute electrical power selectively to one or more of the environmental regulation system 108 and the sub-systems 110.

For example, during normal operation, the power management system 150 can instruct the power distribution system 106 to distribute electrical power from the primary power source 102 to each of the environmental regulation system 108 and the sub-systems 110. If the electrical power from the primary power source 102 is sufficient to sustain the operation of each of the environmental regulation system 108 and the sub-systems 110 concurrently, the power management system 150 can refrain from distributing electrical power from the secondary power source 104.

However, during operation, the power management system 150 may determine that the electrical power provided by the primary power source 102 is insufficient to power each of the environmental regulation system 108 and the sub-systems 110 concurrently. For example, based on the sensor measurements, the power management system 150 may determine that the primary power source 102 is suffering from a total or partial outage. In response, the power management system can instruct the power distribution system 106 to distribute backup electrical power provided by the secondary power source 104 to one or more of the environmental regulation system 108 and the sub-systems 110. In some implementations, the backup electrical is used to supplement the electrical power provided by primary power source 102. In some implementations, the backup electrical is used to replace the electrical power provided by primary power source 102 entirely.

As the secondary power source 104 may have a particular finite capacity for supplying backup electrical power, the power management system 150 can prioritize the distribution of electrical power to one or more of the environmental regulation system 108 and sub-systems 110 over others. For example, if one or more of the environmental regulation system 108 and sub-systems 110 are more important than others, the power management system 150 can prioritize the distribution of electrical power to those systems or sub-systems, such that they remain operational. Further, the power management system 150 can instruct the remaining systems or sub-systems to suspend operations, such that the backup electrical power is conserved. In some implementations, the priority of each of the environmental regulation system 108 and sub-systems 110 can be specified by an administrator or operator.

Further, the power management system 150 can instruct one or more of the environmental regulation system 108 and sub-systems 110 to reduce their consumption of electrical power. As an example, the power management system 150 can instruct the environmental regulation system 108 to reduce the extent by which it actively cools or heats the environment. For instance, if the environmental regulation system 108 is configured to heat the environment, the power management system 150 can reduce the target temperature of the environment (for example, the "set point" temperature), such that less electrical power is consumed. Further, if the environmental regulation system 108 is configured to cool the environment, the power management system 150 can increase the target temperature of the environment, such that less electrical power is consumed. As another example, the power management system 150 can instruct one or more of the sub-systems 110 to switch off, enter into a lower power state such as a standby or "sleep" state, or refrain from performing certain operations that require electrical power. This can be beneficial, for example, in increasing the overall run time of the system under backup electrical power.

Further, the power management system 150 can control the environmental regulation system 108 and sub-systems 110 in such a way that accounts for the characteristics of each of the sub-systems and the particular operating requirements of each of the sub-systems. For example, each of the sub-systems 110 may draw a particular amount of electrical power during operation and dissipate a particular amount of heat into the environment into the ambient environment. Further, each of the sub-system 110 may have particular power requirements or temperature requirements. Further, the environmental regulation system 108 may draw a particular amount of electrical power during operation and have a particular cooling or heating capacity. Based on information, the power management system 150 can selectively operate the environmental regulation system 108 to regulate the environment of the sub-system 110, and instruct certain ones of the sub-systems 110 to remain operational (while instructing other ones of the sub-systems 110 to suspend operations), such that the power and temperature requirements of each of the sub-systems 110 is satisfied to the extent possible.

Further, the power management system 150 can control the operation of the sub-systems 110 in the event of a malfunction in the environmental regulation system 108. For example, upon determining that the environmental regulation system 108 is malfunctioning, the power management system 150 can instruct certain ones of the sub-systems 110 to remain operational (while instructing other ones of the sub-systems 110 to suspend operations), such that the temperature requirements of each of the sub-systems 110 is satisfied to the extent possible.

In some implementations, the power management system 150 can control the environmental regulation system 108 and sub-systems 110 according to different sets of rules, depending on the status of each of the components of the system 100. Each set of rules can specify a different mode of operation of the environmental regulation system 108 and the sub-systems 110.

As a first example, the power management system 150 can determine that there is an outage in the primary power source 102, but that the electrical power supplied by the secondary power source 104 is sufficient to operate the environmental regulation system 108 and at least some of the sub-systems 110 concurrently. For example, the power management system 150 can determine that the secondary power source 104 is capable of supplying a first amount of electrical power. Further, the power management system 150 can determine that the environmental regulation system 108 and at least some of the sub-systems 110 collectively consume a second amount of electrical power during operation, and that the first amount of electrical power is greater than the second amount of electrical power. In response, the power management system 150 can control the operation of the environmental regulation system 108 and the sub-systems 110 to reduce their consumption of electrical power, such that their run time under backup electrical power is extended.

For example, the power management system 150 can obtain information regarding the temperature requirements of each of the sub-system 110 (for example, the maximum temperature at which they can operate safely) and the amount of heat dissipated by each of the sub-systems 110 during operation. Based on this information, the power management system 150 can instruct the environmental regulation system 108 modify the target temperature of the environment, such that the temperature requirements of each of the sub-system 110 is satisfied. For example, if the environmental regulation system 108 is configured to cool the environment of the sub-systems 110, the power management system 150 can instruct the environmental regulation system 108 to increase the target temperature of the environment by an amount that decreases the consumption of electrical power by the environmental regulation system 108, but without causing the sub-systems 110 to exceed their maximum temperature limits.

Further, if the outage in the primary power source 102 persists, the power management system 150 can progressively instruct one or more of the sub-systems 110 to suspend operations (for example, power down or transition into a lower power state).

In some implementations, these sub-systems 110 can be selected based on their priority or criticality, the amount of heat that they dissipate during operation, and their temperature requirements. For example, as the outage of the primary power source 102 persists, the power management system 150 can instruct the sub-systems 110 according to a particular sequence. In the sequence, the sub-systems 110 that have been assigned a lower priority or criticality may be suspended prior to the sub-systems 110 that have been assigned a higher priority or criticality, all other factors being equal. Further, in the sequence, the sub-systems 110 that dissipate more heat into the environment may be suspended prior to the subs-systems 110 that dissipate less heat into the environment, all other factors being equal. Further, in the sequence, the sub-systems 110 that have lower temperature limits may be suspended prior to the subs-systems 110 that have higher temperature limits, all other factors being equal.

In some implementations, the sub-systems 110 can be selected based on a single factor or parameter. For example, the sub-systems 110 can be selected based on one of their priority or criticality, the amount of heat that they dissipate during operation, or their temperature requirements.

In some implementations, the sub-systems 110 can be selected based on multiple factors or parameters in combination. Further, the sub-systems 110 can be selected according to different modes of operation, depending on the circumstances. Several modes of operation are described below.

As an example, a first mode of operation can be employed when the primary power source 102 has suffered an outage and the electrical power supplied by the secondary power source 104 is sufficient to operate the environmental regulation system 108. According to the first mode of operation, the power management system 150 instructs the environmental regulation system 108 to continue operation, such that the sub-systems 110 are operating in a proper, cooled and ventilated environment. As the environmental regulation system 108 is running, in some implementations, the power management system 150 need not monitor the amount of heat dissipated by the sub-systems 110. For example, the power management system 150 can concentrate on maximizing (or other extending) the runtime of the secondary power source 104 by suspending the operation of the sub-systems 110 based on their criticality and adjusting the temperature set point of the environmental regulation system 108 to reduce its power consumption, while also ensuring that the temperature requirements of the sub-systems 110 (such as the maximum temperature at which the sub-systems 110 can operate safely) are not exceeded.

As an example, assume that the initial runtime of the secondary power source 104 is eight hours (for example, under full load), and the environmental regulation system 108 is configured to provide cooling for the sub-systems 110 according to a set point of 22° C. Further, in this example, the sub-systems 110 include an equipment A (criticality level: low, maximum operating temperature: 55° C.), an equipment B (criticality level: intermediate, maximum operating temperature: 50° C.), and an equipment C (criticality level: high, maximum operating temperature: 60° C.). The power management system 150 can first determine the lowest of the maximum operating temperature of all the sub-systems 110 that are running and adjust the set point of the environmental regulation system 108 based on the determination. In the above example, the lowest of the maximum operating temperature of the sub-systems 110 is 50° C. and the environmental regulation system 108 set point can be adjusted to a point between 40° C. to 45° C. to reduce the power consumption.

After adjusting the set point of the environmental regulation system 108, the power management system 150 can keep the equipment having a low criticality (in this example, equipment A) running for a period of time (for example, 2 hours). After the period of time has elapsed, the power management 150 system suspend the operation of the equipment having the low criticality to further reduce the power consumption and to increase the runtime of the secondary power source 104.

After suspending the operation of any of the sub-systems 110, the power management system 150 can update the set point of the environmental regulation system 108 based on the lowest of the maximum operating temperature of remaining sub-systems 110 that are still in operation. In the above example, this maximum operating temperature is still 50° C. Accordingly, the environmental regulation system 108 can maintain the set point (for example, at a point between 40° C. to 45° C.). After a period of time (for example, six hours), if the primary power source 102 is still suffering from an outage, the power management system 150 can suspend the operation of the sub-systems 110 having the next higher criticality (in this example, equipment B) to further reduce the power consumption. Further, this may further reduce the value of the lowest of the maximum operating temperatures of remaining sub-systems 110 that are still in operation (in this example, this value is now 60° C.). The power distribution system 106 can instruct the environmental regulation system 108 to readjust its set point to account for the value. For instance, in this example, the set point can be adjusted to a point between 50° C. to 55° C. Further, the power management system 150 can keep the equipment having a higher criticality running until either the primary power source 102 is restored or the secondary power source 104 is depleted.

As another example, a second mode of operation can be employed when the primary power source 102 has suffered an outage and the electrical power supplied by the secondary power source 104 is insufficient to operate the environmental regulation system 108. According to the second mode of operation, the power management system 150 can combine at least three factors or parameters to prioritize the operation of the sub-systems 110, such as the priority or criticality of each of the sub-systems 110, the amount of heat that they dissipate during operation, and their temperature requirements.

As an example, assume that the initial runtime of the backup power source is eight hours (for example, under full load), and that the environmental regulation system is off. Further, in this example, the sub-systems 110 include an equipment A (criticality level: low, amount of dissipated heat: high, maximum operating temperature: 55° C.), an equipment B (criticality level: intermediate, amount of dissipated heat: low, maximum operating temperature: 50° C.), and an equipment C (criticality level: high, amount of dissipated heat: intermediate, maximum operating temperature: 60° C.). As in the previous example, the power management system 150 can determine, at first, that the equipment having a low criticality (in this example, equipment A) can run for a period of time (for example, two hours). However, as that equipment is dissipating a large amount of heat, the power management system 150 can reduce the running of that equipment to a shorter amount of time (for example, only one hour), then suspend the operation of that equipment. This can be performed, for example, to avoid or otherwise mitigate an increase in the ambient temperature that might exceed the temperature requirements for the other sub-systems 110. Further, in this example, for equipment B, the power management system 150 can instruct equipment B to run initially for a period of time (for example, six hours) based on its criticality level. Further, because equipment B dissipates a low amount of heat, the power management system 150 can determine that there is no need to reduce its initial runtime (in this example, six hours). After the period of time has elapsed, the power management system 150 can suspend the operation of equipment B. Further, in this example, the power management system 100 may not suspend the operation of equipment C based on the high criticality level of equipment C. Further, the power management system 150 can ensure, based on data regarding the heat dissipation of all of the sub-systems 110, that the ambient temperature will not exceed the operating temperature of equipment C (for example, 60° C.) until either the primary power source 102 is restored or the secondary power source 104 is depleted.

As another example, a third mode of operation can be employed when the primary power source 102 is not suffering from an outage but the environmental regulation system 108 is malfunctioning or unable to satisfy the temperature requirements of the sub-systems 110. According to the third mode of operation, the power management system 150 may not prioritize extending the runtime of the secondary power source 104, as the primary power source 102 is available and sufficient to sustain the operation of the sub-systems 110. Instead, the power management system 150 may prioritize maintaining the dissipated heat by the sub-systems 110 and ensuring that the ambient temperature satisfies the temperature requirements of the sub-systems 110.

For example, assume that the primary power source 102 is not suffering from an outage and is providing electrical power sufficient to power the sub-systems 110, and that the environmental regulation system 108 is malfunctioning. Further, in this example, the sub-systems 110 include an equipment A (criticality level: low, amount of dissipated heat: high, maximum operating temperature: 55° C.), an equipment B (criticality level: intermediate, amount of dissipated heat: low, maximum operating temperature: 50° C.), and an equipment C (criticality level: high, amount of dissipated heat: intermediate, maximum operating temperature: 60° C.). According to the third mode of operation, the power management system can determine an expected time that is needed to troubleshoot and fix the environmental regulation system 108 (for example, by an operator). In some implementations, the expected time to fix the environmental regulation system 108 can be specified by the operator or from the power management system database. For instance, assuming that the expected repair time is sixteen hours, the power management system 150 can analyze the data regarding the heat dissipation of the sub-systems 110 to ensure that, after sixteen hours, the most critical of the sub-systems 110 is still running and that the environmental temperature does not exceed the temperature requirements of the most critical sub-systems 110. In this example, the power management system 150, based on the data regarding the amount of heat dissipated by the sub-systems 110, can suspend the operation of equipment A and B at hours X and Y respectively. The value of X and Y can be calculated by the power management system 150, on the condition that, by suspending the operation of equipment A and B at hours X and Y, respectively, the equipment C is still running and the room temperature is below 60° C. after sixteen hours. The system can determine the value of X and Y empirically (for example, based on experimental data, or through trial and error based on past occurrences).

Although example sub-systems 110, parameter values, and periods of time are described above, these are merely illustrative examples. In practice, a system 100 may include any number of sub-systems 110, each having different respective parameter values. Further, the power management system 150 can selectively perform operations according to periods of time different than those described above.

Upon restoration of electrical power from the primary power source 102, the power management system 150 can instruct each of the sub-systems 110 to resume operations. For example, the power management system 150 can instruct each of the sub-systems 110 to switch on or transition back into a higher power state.

As another example, the power management system 150 can determine that there is an outage in the primary power source 102, and that the electrical power supplied by the secondary power source 104 is insufficient to operate the environmental regulation system 108 and at least some of the sub-systems 110 concurrently. For example, the power management system 150 can determine that the secondary power source 104 is capable of supplying a first amount of electrical power. Further, the power management system 150 can determine that the environmental regulation system 108 and at least some of the sub-systems 110 collectively consume a second amount of electrical power during operation, and that the first amount of electrical power is less than the second amount of electrical power. In response, the power management system 150 can control the operation of the environmental regulation system 108 and the sub-systems 110 to reduce their consumption of electrical power, such that their run time under backup electrical power is extended.

For example, in a similar manner as described above, the power management system 150 can switch off the environmental regulation system 108. Further, the power management system 150 can obtain information regarding the temperature requirements of each of the sub-system 110 (for example, the maximum temperature at which they can operate safely) and the amount of heat dissipated by each of the sub-systems 110 during operation. Based on this information, the power management system 150 can progressively instruct one or more of the sub-systems 110 to suspend operations (for example, power down or transition into a lower power state).

In a similar manner as described above, in some implementations, these sub-systems 110 can be selected based on their priority, the amount of heat that they dissipate during operation, and their temperature requirements. For example, as the outage of the primary power source 102 persists, the power management system 150 can instruct the sub-systems 110 according to a particular sequence. In the sequence, the sub-systems 110 that have been assigned a lower priority may be suspended prior to the sub-systems 110 that have been assigned a higher priority, all other factors being equal. Further, in the sequence, the sub-systems 110 that dissipate more heat into the environment may be suspended prior to the subs-systems 110 that dissipate less heat into the environment, all other factors being equal. Further, in the sequence, the sub-systems 110 that have lower temperature limits may be suspended prior to the subs-systems 110 that have higher temperature limits, all other factors being equal.

Upon restoration of electrical power from the primary power source 102, the power management system 150 can instruct each of the sub-systems 110 to resume operations. For example, the power management system 150 can instruct each of the sub-systems 110 to switch on or transition back into a higher power state. Further, the power management system 150 can instruct the environmental regulation system 108 to resume operation.

As another example, the power management system 150 can determine that the primary power source 102 is supplying electrical power, but that the environmental regulation system 108 is malfunctioning (for example, is unable to provide heating or cooling). In response, the power management system 150 can control the operation of the sub-systems 110 such that they operate within their temperature limits.

For example, in a similar manner as described above, the power management system 150 can obtain information regarding the temperature requirements of each of the sub-system 110 (for example, the maximum temperature at which they can operate safely) and the amount of heat dissipated by each of the sub-systems 110 during operation. Based on this information, the power management system 150 can progressively instruct one or more of the sub-systems 110 to suspend operations (for example, power down or transition into a lower power state).

In a similar manner as described above, in some implementations, these sub-systems 110 can be selected based on their priority, the amount of heat that they dissipate during operation, and their temperature requirements. For example, as the outage of the primary power source 102 persists, the power management system 150 can instruct the sub-systems 110 according to a particular sequence. In the sequence, the sub-systems 110 that have been assigned a lower priority may be suspended prior to the sub-systems 110 that have been assigned a higher priority, all other factors being equal. Further, in the sequence, the sub-systems 110 that dissipate more heat into the environment may be suspended prior to the subs-systems 110 that dissipate less heat into the environment, all other factors being equal. Further, in the sequence, the sub-systems 110 that have lower temperature limits may be suspended prior to the subs-systems 110 that have higher temperature limits, all other factors being equal.

Upon restoration of the environmental regulation system 108, the power management system 150 can instruct each of the sub-systems 110 to resume operations. For example, the power management system 150 can instruct each of the sub-systems 110 to switch on or transition back into a higher power state.

Further, during each of the different modes of operation, the power management system 150 can transmit notifications to one or more users or entities with information regarding the operation of the system 100. As examples, the power management system 150 can transmit text messages (such as short message service, SMS, messages), chat messages, e-mails, faxes, voice calls, video calls, or any other communication. Further, the notifications can include information regarding the operation of the system 100. For example, a notification can include an indication of an outage in the primary power source 102. As another example, a notification can include an indication of an estimated run time of the system 100 under backup electrical power or a remaining capacity of the secondary power source 104. As another example, a notification can include an indication of the status of the environmental regulation system 108 (for example, whether the environmental regulation system is malfunction, or the power state of the environmental regulation system 108). As another example, a notification can include indications of the status of each of the sub-systems 110 (for example, the power states of each of the sub-systems 110). As another example, a notification can include sensor information collected by one or more of the sensors 114. In some implementations, the notification can be transmitted according to certain specified users or entities in accordance with the sets of rules.

Figure 2:
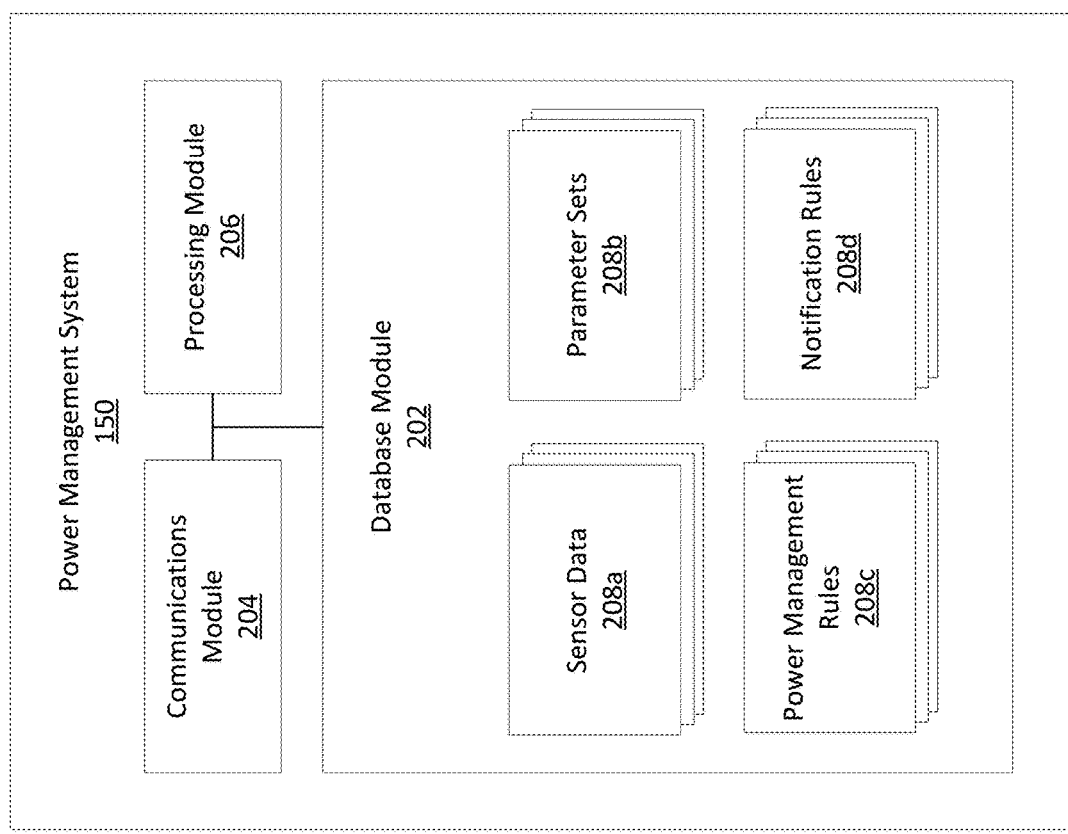
FIG. 2 is a diagram of an example power management system.

FIG. 2 shows various aspects of the power management system 150. The power management system 150 includes several modules that perform particular functions related to the operation of the system 100. For example, the power management system 150 can include a database module 202, a communications module 204, and a processing module 206.

The database module 202 maintains information related to distributing electrical power and controlling the operation of the environmental regulation system 108 and the sub-systems 110.

As an example, the database module 202 can store sensor data 208a obtained by one or more of the sensors 114. Example sensor data 208a is described above. For example, the sensor data 208a can include measurements regarding the operation of the primary power source 102, the operation of the secondary power source 104, operation of the environmental regulation system 108, the operation of each of the sub-systems 110, the operation of the power distribution system 106, or any combination thereof. Further, the sensor data 208a can be collected continuous, periodically, or intermittently over time.

As another example, the database module 202 can store parameter sets 208b regarding each of the environmental regulation system 108 and the sub-systems 110. Example parameter sets are described above. For instance, each of the parameter sets 208b can include information regarding the characteristics of a respective one of the environmental regulation system 108 and the sub-systems 110. As another example, this can include information such as the amount of electrical power consumed by the sub-system 110, the amount of heat dissipated by the sub-system 110 during operation, and the temperature requirements (for example, a maximum temperature limit) of the sub-system 110 to operate safely. As another example, this can include information regarding the amount of electrical power consumed by the environmental regulation system 108 during operation, and a cooling or heating capacity of the environmental regulation system 108.

As another example, the database module 202 can store power management rules 208c that specify different modes of operation of the environmental regulation system 108 and the sub-systems 110, depending on the sensor data 208a and the parameter sets 208b. Example power management rules 208c are described above and below (for example, with respect to FIGS. 3 and 4). As examples, the power management rule 208c may specify that the environmental regulation system 108 and the sub-systems 110 be operated according to different modes of operation, depending on whether there is an outage in the primary power source 102, whether the amount of electrical power supplied by the secondary power source 104 is sufficient to operate the environmental regulation system 108 and at least some of the sub-systems 110 concurrently, and whether the environmental regulation system is malfunctioning.

As another example, the database module 202 can store notification rules 208d that specify different circumstances in which the power management system 150 will transmit notifications to one or more users or entities. As an example, the notification rules 208d may specify that notifications be transmitted to in response to certain trigger events or combination of trigger events. Further the notification rules 208d may specify that those notifications be transmitted to certain users or entities using certain communications techniques.

The communications module 204 allows for the transmission of data to and from the power management system 150. For example, the communications module 204 can be communicatively connected to a communications network (for example, a wired or wireless network), such that it can transmit data to and receive data from each of the sensors 114. As another example, the communications module 204 can be communicatively connected to the communications network, such that it can transmit data to and receive data from one or more of the primary power source 102, the secondary power source 104, the environmental regulation system 108, and the sub-systems 110. Information received from these components can be processed (for example, using the processing module 206) and stored (for example, using the database module 202). Further, information from the power management system 150 (for example, information stored on the database module 202, or commands or instructions generated by the power management system 150) can be transmitted to the other components of the system 100 through the communications module 204. Further, notifications can be transmitted to the communication devices of one or more users or entities through the communications module 204.

Further, the communications module 204 can allow for the transmission of data between the power management system 150 and one or more computer systems associated with one or more human operators. For example, the communications module 204 can transmit data to one or more computer systems regarding an operation of the power management system 150 or the other components of the system 100, such that one or more operators can ascertain the status of the power management system 150 or the rest of the system 100 in real-time or substantially real time. As another example, the communications module 204 can receive data from one or more computer systems. For instance, the communications module 204 can receive inputs or modifications to the data stored in the database module, such as the parameter sets 208b, power management rules 208c, and notification rules 208d. Further, the communications module 204 can receive commands specifying that the power management system 150 or the other components of the system 100 operate in a particular manner, and relay those commands to the appropriate components of the system 100. For example, the commands may specify that the sub-systems 110 or environmental regulation system 108 operate in a particular manner that overrides the commands originally provided by the power management system 150 (such as suspending the operation of a particular sub-system 110, adjusting a set point temperature of the environmental regulation system 108, or other such commands). In some implementations, the inputs, modifications, and commands may be provided by one or more human operators using the one or more computer systems.

The processing module 206 processes data stored or otherwise accessible to the power management system 150. For instance, the processing module 206 can determine, given particular sensor data 208a, parameter sets 208b, and power management rules 208c, a particular command or set of commands for controlling the operation of one or more of the components of the system 100. The commands can be provided to the other components of the system 100 using the communications module 204 and stored for later retrieval via the database module 202. Example applications of the power management rules 208c are described above and below (for example, with respect to FIGS. 3 and 4).

Further, the processing module 206 can determine, given particular sensor data 208a, parameter sets 208b, power management rules 208c, and notification rules 208d, a notification or set of notifications to be transmitted to the communications devices of one or more users or entities. The commands can be provided to the other components of the system 100 using the communications module 204 and stored for later retrieval via the database module 202.

Example Processes

Figure 3:
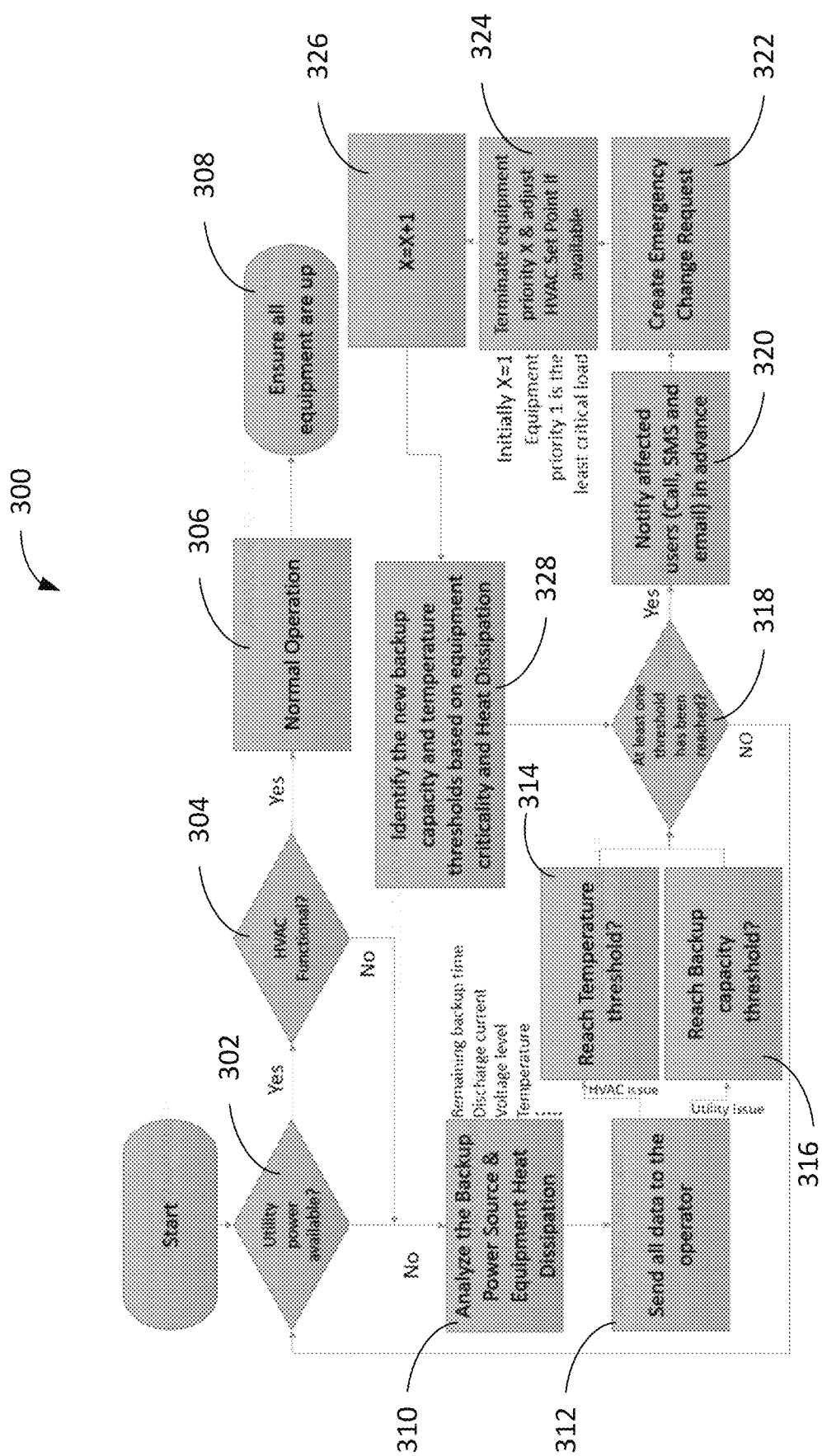
FIG. 3 is a flow chart diagram of an example process for distributing electrical power.

An example process 300 for distributing electrical power is shown in FIG. 3. In some implementations, the process 300 can be performed by the power management systems described in this disclosure (for example, the power management system 150 shown and described with respect to FIGS. 1 and 2).

In the process 300, the power management system determines whether utility power is available (step 302). For example, the power management system can determine whether the primary power source 102 (for example, as shown in FIG. 1) is providing electrical power, or whether the primary power source 102 is suffering from an outage.

If utility power is available, the power management system determines whether an HVAC system is functional (step 304). For example, the power management system can determine whether the environmental regulation system 108 (for example, as shown in FIG. 1) is functional, or whether the environmental regulation system 108 is malfunctioning.

If the HVAC system is functional, the power management system operates according to a "normal" operation mode. For example, referring to FIG. 1, the power management system can instruct the environmental regulation system 108 to regulate the environment according to a "normal" operation mode (for example, maintain the environment according to a particular temperature, a particular humidity, a particular ventilation, a particular air flow of an environment, or any other setting). As another example, referring to FIG. 1, the power management system can instruct each of the sub-systems 110 to operate according to operate according to a "normal" operation mode (for example, operate according to a higher power state to perform their prescribe functions).

Further, the power management system can monitor the operation of the environmental regulation system 108 and each of the sub-systems 110 (step 308). For example, the power management system can monitor each of the environmental regulation system 108 and the sub-systems 110 to determine whether they are malfunctioning.

Referring back to steps 302 and 304, if utility power is not available or the HVAC system is not functional, the power management system analyzes a backup power source and a heat dissipation of the systems managed by the power management system (step 310). For example, the power management system can determine the characteristic of the secondary power source 104 (for example, as shown in FIG. 1), such as the voltage and the current of electricity provided by the secondary power source 104, the amount of electrical power that the secondary power source 104 can supply at any given time, the maximum amount of electrical power that can be supplied by the secondary power source 104 (for example, a maximum capacity of the secondary power source 104), and the remaining amount of electrical power that can be supplied by the secondary power source 104 before it is depleted (for example, the remaining capacity of the secondary power source 104). As another example, the power management system can determine the amount of heat that is being dissipated by of the electrically powered sub-systems 110 (e.g., as shown in FIG. 1). In some implementations, the power management system can collect additional information, for example, using one or more of the sensors 114 described with respect to FIG. 1.

Further, the power management system 312 transmits the collected data to an operator (for example, one or more users or entities). As examples, the power management system can transmit text messages (such as short message service, SMS, messages), chat messages, e-mails, faxes, voice calls, video calls, or any other communication including the collected data.

If the HVAC system is not functional, the power management system determines whether a particular threshold temperature has been reached (step 314). In some implementations, the threshold temperature can be a temperature limit associated with one of the sub-systems 110. In some implementations, the threshold temperature can be a temperature limit associated with multiple ones of the sub-systems 110 collectively. In some implementations, the threshold temperature can be selected empirically, for example, by an operator of the power management system. In some implementations, the threshold temperature can be approximately 27° C. (for example, 27° C.±5%, ±10%, ±15%, or some other tolerance range). In practice, other threshold temperatures can be used, depending on the implementation.

Alternatively, if the utility power is suffering from an outage, the power management system determines whether a particular backup capacity threshold of the backup power source has been reached (step 316). For example, the power management system can determine the remaining amount of electrical power that can be supplied by the secondary power source 104 before it is depleted, as a percentage of the maximum amount of electrical power than the secondary power source 104 can supply (for example, the remaining capacity as a percentage of the maximum capacity). Further, the power management system can determine whether the remaining capacity has fallen below a threshold level. In some implementations, the percentage can be approximately 95% (for example, 95%±0.1%, ±0.5%, ±1%, or some other tolerance range). In practice, other threshold values can be used, depending on the implementation.

If none of the thresholds have been reached, the power management system returns to step 302 and continues monitoring the utility power for outages and the HVAC system for malfunctions. This cycle can repeat continuously, periodically, or intermittently over time.

Alternatively, if at least one of the thresholds have been reached, the power management system transmits a notification to an operator (for example, one or more users or entities). As examples, the power management system can transmit text messages (such as short message service, SMS, messages), chat messages, e-mails, faxes, voice calls, video calls, or any other communication. The notification can include an indication that a particular threshold was reached. Further, the notification can information additional information, such as data collected by one or more of the sensors 114.

Further, the power management system generates a command requesting that one or more of the environmental regulation system 108 and sub-systems 110 to change its mode of operation (step 322). Example modifications to the mode of operation as described above and below.

For instance, if the HVAC system is operational, the power management system can generate a command instructing the HVAC system to reduce the amount of electrical power that is consumes (step 324). For example, if the HVAC system is configured to heat the environment, the power management system can reduce the target temperature of the environment (for example, the set point temperature), such that less electrical power is consumed. Further, if the HVAC system is configured to cool the environment, the power management system can increase the target temperature of the environment, such that less electrical power is consumed.

Further, the power management system can prioritize the distribution of electrical power to one or more of the sub-systems 110 over others. As an example, each of the sub-systems 110 can be assigned a respective priority metric $X_i$, such as an index value from 1 to N, where 1 is the lowest priority and N is the highest priority. The power management system 100 can generate a command requesting that the sub-systems 110 having the lowest priority (for example, $X_i=1$) suspend their operations (step 324), and increment the priority counter (for example, X=X+1) (step 326).

Further, the power management system can continue monitoring the operation of the backup power source, the HVAC system, and the other electrically-powered sub-systems (step 328). For example, the power management system can continuously or periodically determine the remaining capacity of the backup power source, the temperature limits of the sub-systems, the heat dissipated by the sub-systems. Further, the power management system can modify at least one of the temperature threshold or the remaining capacity threshold. For example, the power management system can increase the temperature threshold, and decrease the remaining capacity threshold. If one of the threshold values is again reached, the power management system can generate another notification (step 320), and generate another emergency change request (step 322). The request can include commands to suspend the operation of system having the next highest priority (for example, X=2) and to modify the temperature setting of the HVAC system (step 324). Further, the power management system can continue monitoring the operation of the backup power source, the HVAC system, and the other electrically-powered sub-systems, and modify one or more of the threshold values again. This cycle can repeat until the backup power source is depleted or the utility power is available again.

Figure 4:
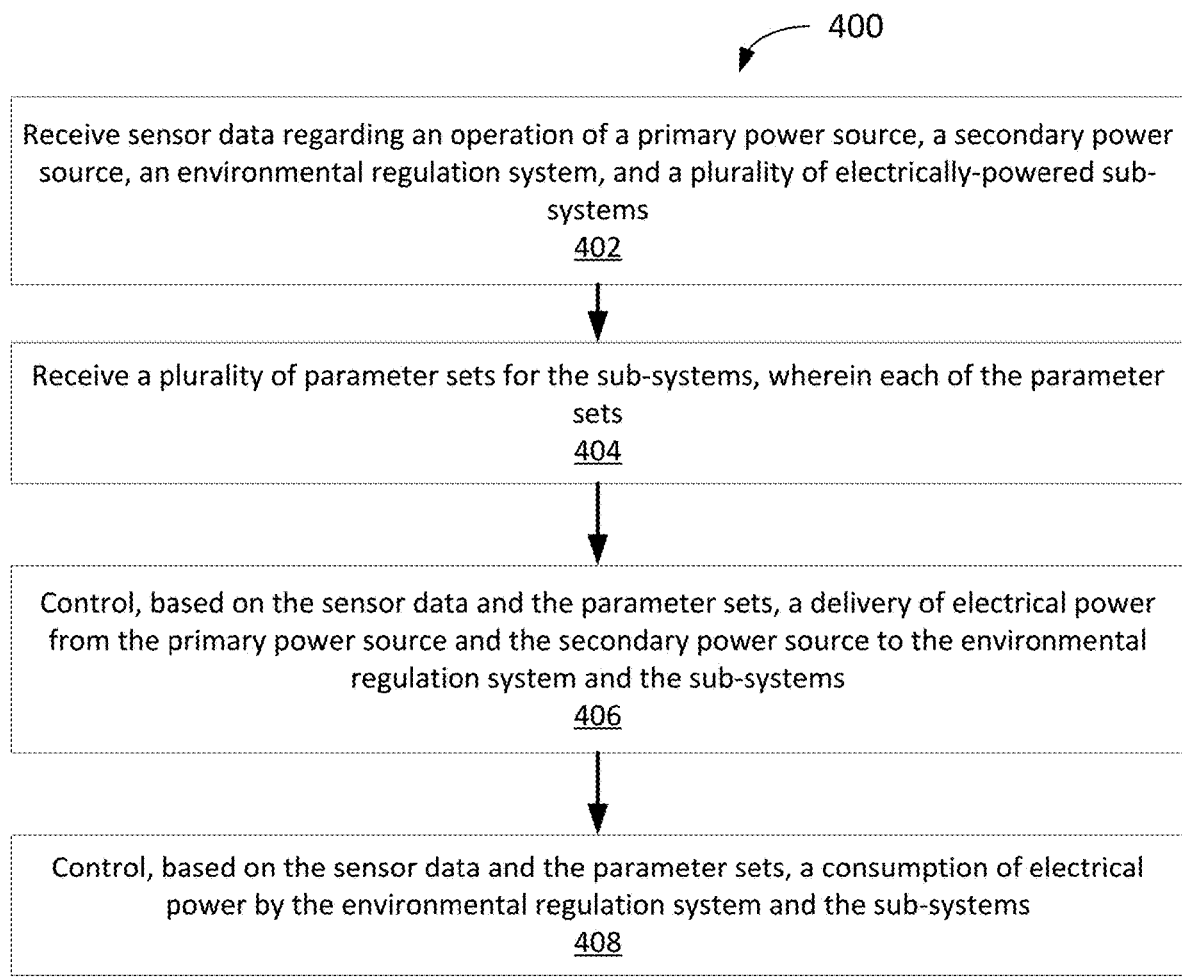
FIG. 4 is a flow chart diagram of another example process for distributing electrical power.

An example process 400 for distributing electrical power is shown in FIG. 4. In some implementations, the process 400 can be performed by the power management systems described in this disclosure (for example, the power management system 150 shown and described with respect to FIGS. 1 and 2).

In the process 400, a power management system receives sensor data regarding an operation of a primary power source, a secondary power source, an environmental regulation system, and a plurality of electrically-powered sub-systems (step 402). As an example, referring to FIG. 1, the power management system 150 can receive sensor data from one of the more of the sensors 114 regarding the operation of the primary power source 102, the secondary power source 104, the environmental regulation system 108, and the sub-systems 110.

In some implementations, the primary power source can be an electrical grid, such as an electrical grid provided by a public utility or a private entity. Further, the secondary power source can include at least one of a standby power generation system or a battery.

In some implementations, the environmental regulation system can include a heating, ventilation and air conditioning (HVAC) system. Further, the environmental regulation system can control the condition of environment of at least some of the sub-systems.

In some implementations, the sub-systems can include one or more computer systems, one or more telecommunications systems, or a combination thereof.

In some implementations, the sensor data can include an indication of an amount of electrical power provided by the primary power source, an indication of an amount of electrical power provided by the secondary power source, an amount of electrical power consumed by the environmental regulation system, an amount of electrical power consumed by the plurality of electrically-powered sub-systems, or a combination thereof. In some implementations, the sensor data can include an indication of a temperature of an environment of the sub-systems.

The power management system receives a plurality of parameter sets for the sub-systems (step 404). Each of the parameter sets includes a first parameter indicting a priority of a respective sub-system relative to the other sub-systems, a second parameter indicating an amount of heat dissipated by the respective sub-system during operation, and a third parameter indicating a temperature requirement associated with the respective sub-system.

In some implementations, each of the parameter sets can include a fourth parameter indicting a number of users of the respective sub-system, a fifth parameter indicating a location of the respective sub-system, a sixth parameter indicating a type of service provided by the respective sub-system, or a combination thereof.

The power management system controls, based on the sensor data and the parameter sets, a delivery of electrical power from the primary power source and the secondary power source to the environmental regulation system and the sub-systems (step 406).

The power management system controls, based on the sensor data and the parameter sets, a consumption of electrical power by the environmental regulation system and the sub-systems (step 408).

The consumption of electrical power by the environmental regulation system and the sub-systems can be controlled according to one or more modes of operation.

As an example, in some implementations, the consumption of electrical power by the environmental regulation system and the sub-systems can be controlled, at least in part, by modifying a temperature setting of the environmental regulation system (for example, a "set point"). Modifying the temperature setting of the environmental regulation system can include increasing the temperature setting of the environmental regulation system.

As an example, in some implementations, the consumption of electrical power by the environmental regulation system and the sub-systems can be controlled, at least in part, by selecting a subset of the sub-systems, reducing a consumption of electrical power by the subset of the sub-systems. The consumption of electrical power by the subset of the sub-systems can be reduced, at least in part, by switching off the subset of the sub-systems. In some implementations, the subset of the sub-systems can be selected based on one of the first, the second, or the third parameters of each of the sub-systems. In some implementations, the subset of the sub-systems can be selected based on a combination of the first, the second and the third parameters of each of the sub-systems.

As an example, in some implementations, the consumption of electrical power by the environmental regulation system and the sub-systems can be controlled, at least in part, by determining, based on the sensor data, an interruption of electrical power supplied by the primary power source. Further, a determination can be made, based on the data, that electrical power supplied by the secondary power source is sufficient to operate the environmental regulation system. Further, in response to these determinations, a temperature setting of the environmental regulation system can be increased, a consumption of electrical power by a subset of the sub-systems by be reduced, or both. In some implementations, the subset of the sub-systems can be selected based on the first parameters of each of the sub-systems.

As an example, in some implementations, the consumption of electrical power by the environmental regulation system and the sub-systems can be controlled, at least in part, by determining, based on the sensor data, an interruption of electrical power supplied by the primary power source. Further, a determination can be made, based on the data, that electrical power supplied by the secondary power source is not sufficient to operate the environmental regulation system. Further, in response to these determinations, a consumption of electrical power by a subset of the sub-systems can be reduced. In some implementations, the subset of the sub-systems can be selected based on one of the first, the second, or the third parameters of each of the sub-systems. In some implementations, the subset of the sub-systems can be selected based on a combination of the first, the second and the third parameters of each of the sub-systems.

As an example, in some implementations, the consumption of electrical power by the environmental regulation system and the sub-systems can be controlled, at least in part, by determining, based on the sensor data, a malfunction in the environmental regulation system, and in response to this determination, reducing a consumption of electrical power by a subset of the sub-systems. In some implementations, the subset of the sub-systems can be selected based on one of the first, the second, or the third parameters of each of the sub-systems. In some implementations, the subset of the sub-systems can be selected based on a combination of the first, the second and the third parameters of each of the sub-systems.

Additional details regarding example modes of operations are described above.

In some implementations, the process 400 can also include receiving, by the power management system from a computer system, a modification to at least one parameter set of the plurality of parameter sets. The modification can be specified by a human operator. Further, the power management system can control, based on the modification, the consumption of electrical power by the environmental regulation system and the sub-systems. As an example, referring to FIG. 2, the power management system 150 can receive a modification to the data stored in the database module, such as the parameter sets 208*b*, power management rules 208*c*, and notification rules 208*d*.

In some implementations, the process 400 can also receiving, by the power management system from a computer system, a command regarding an operation of the environmental regulation system and the sub-systems. The command can be specified by a human operator. Further, the power management system can control the consumption of electrical power by the environmental regulation system and the sub-systems in accordance with the command. For example, referring to FIG. 1, the command may specify that the sub-systems 110 or environmental regulation system 108 operate in a particular manner that overrides the commands originally provided by the power management system 150 (such as suspending the operation of a particular sub-system 110, adjusting a set point temperature of the environmental regulation system 108, or other such commands).

Example Systems

Some implementations of the subject matter and operations described in this specification can be implemented in digital electronic circuitry, or in computer software, firmware, or hardware, including the structures disclosed in this specification and their structural equivalents, or in combinations of one or more of them. For example, in some implementations, one or more components of the power management system 150 can be implemented using digital electronic circuitry, or in computer software, firmware, or hardware, or in combinations of one or more of them. In another example, the processes shown in FIGS. 3 and 4 can be implemented using digital electronic circuitry, or in computer software, firmware, or hardware, or in combinations of one or more of them.

Some implementations described in this specification can be implemented as one or more groups or modules of digital electronic circuitry, computer software, firmware, or hardware, or in combinations of one or more of them. Although different modules can be used, each module need not be distinct, and multiple modules can be implemented on the same digital electronic circuitry, computer software, firmware, or hardware, or combination thereof.

Some implementations described in this specification can be implemented as one or more computer programs, that is, one or more modules of computer program instructions, encoded on computer storage medium for execution by, or to control the operation of, data processing apparatus. A computer storage medium can be, or can be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (for example, multiple CDs, disks, or other storage devices).

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, for example, an FPGA (field programmable gate array) or an ASIC (application specific integrated circuit). The apparatus can also include, in addition to hardware, code that creates an execution environment for the computer program in question, for example, code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages. A computer program may, but need not, correspond to a file in a file system. A program can be stored in a portion of a file that holds other programs or data (for example, one or more scripts stored in a markup language document), in a single file dedicated to the program in question, or in multiple coordinated files (for example, files that store one or more modules, sub programs, or portions of code). A computer program can be deployed to be executed on one computer or on multiple computers that are located at one site or distributed across multiple sites and interconnected by a communication network.

Some of the processes and logic flows described in this specification can be performed by one or more programmable processors executing one or more computer programs to perform actions by operating on input data and generating output. The processes and logic flows can also be performed by, and apparatus can also be implemented as, special purpose logic circuitry, for example, an FPGA (field programmable gate array) or an ASIC (application specific integrated circuit).

Processors suitable for the execution of a computer program include, by way of example, both general and special purpose microprocessors, and processors of any kind of digital computer. Generally, a processor will receive instructions and data from a read only memory or a random access memory or both. A computer includes a processor for performing actions in accordance with instructions and one or more memory devices for storing instructions and data. A computer may also include, or be operatively coupled to receive data from or transfer data to, or both, one or more mass storage devices for storing data, for example, magnetic, magneto optical disks, or optical disks. However, a computer need not have such devices. Devices suitable for storing computer program instructions and data include all forms of non-volatile memory, media and memory devices, including by way of example semiconductor memory devices (for example, EPROM, EEPROM, AND flash memory devices), magnetic disks (for example, internal hard disks, and removable disks), magneto optical disks, and CD-ROM and DVD-ROM disks. The processor and the memory can be supplemented by, or incorporated in, special purpose logic circuitry.

To provide for interaction with a user, operations can be implemented on a computer having a display device (for example, a monitor, or another type of display device) for displaying information to the user. The computer can also include a keyboard and a pointing device (for example, a mouse, a trackball, a tablet, a touch sensitive screen, or another type of pointing device) by which the user can provide input to the computer. Other kinds of devices can be used to provide for interaction with a user as well. For example, feedback provided to the user can be any form of sensory feedback, such as visual feedback, auditory feedback, or tactile feedback. Input from the user can be received in any form, including acoustic, speech, or tactile input. In addition, a computer can interact with a user by sending documents to and receiving documents from a device that is used by the user. For example, a computer can send webpages to a web browser on a user's client device in response to requests received from the web browser.

A computer system may include a single computing device, or multiple computers that operate in proximity or generally remote from each other and typically interact through a communication network. Examples of communication networks include a local area network ("LAN") and a wide area network ("WAN"), an inter-network (for example, the Internet), a network including a satellite link, and peer-to-peer networks (for example, ad hoc peer-to-peer networks). A relationship of client and server may arise by virtue of computer programs running on the respective computers and having a client-server relationship to each other.

Figure 5:
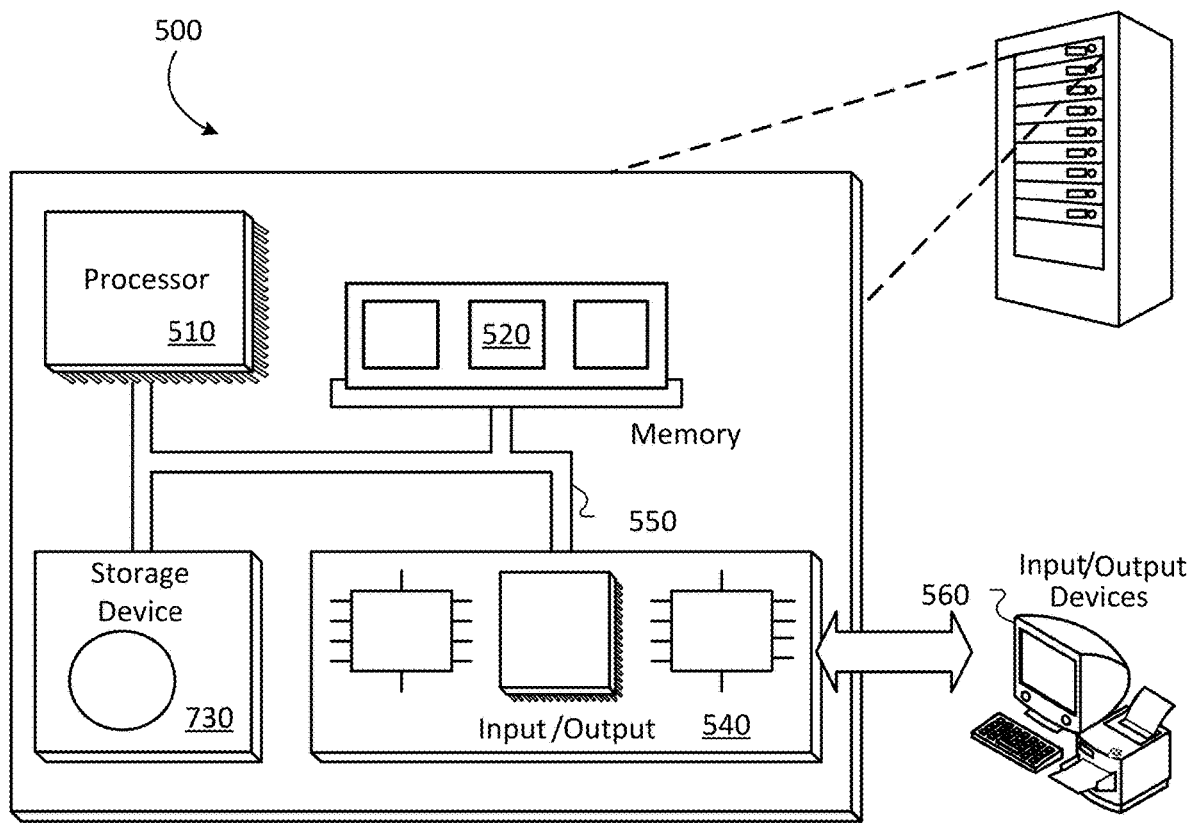
FIG. 5 is a schematic diagram of an example computer system.

FIG. 5 shows an example computer system 500 that includes a processor 510, a memory 520, a storage device 530 and an input/output device 540. Each of the components 510, 520, 530 and 540 can be interconnected, for example, by a system bus 550. In some implementations, the computer system 500 can be used to control the operation of the system 100. For example, the power management system 150 in FIG. 1 can include a computer system 500 to monitor and control the operation of the system 100, including the distribution of power among the components of the system 100. The processor 510 is capable of processing instructions for execution within the system 500. In some implementations, the processor 510 is a single-threaded processor, a multi-threaded processor, or another type of processor. The processor 510 is capable of processing instructions stored in the memory 520 or on the storage device 530. The memory 520 and the storage device 530 can store information within the system 500.

The input/output device 540 provides input/output operations for the system 500. In some implementations, the input/output device 540 can include one or more of a network interface device, for example, an Ethernet card, a serial communication device, for example, an RS-232 port, or a wireless interface device, for example, an 802.11 card, a 3G wireless modem, a 4G wireless modem, or a 5G wireless modem, or both. In some implementations, the input/output device can include driver devices configured to receive input data and send output data to other input/output devices, for example, keyboard, printer and display devices 560. In some implementations, mobile computing devices, mobile communication devices, and other devices can be used.

While this specification contains many details, these should not be construed as limitations on the scope of what may be claimed, but rather as descriptions of features specific to particular examples. Certain features that are described in this specification in the context of separate implementations can also be combined. Conversely, various features that are described in the context of a single implementation can also be implemented in multiple embodiments separately or in any suitable sub-combination.

A number of embodiments have been described. Nevertheless, various modifications may be made without departing from the spirit and scope of the invention. Accordingly, other embodiments are within the scope of the claims.

What is claimed is:

1. A method comprising:
   receiving, by a power management system, sensor data regarding an operation of a primary power source, a secondary power source, an environmental regulation system, and a plurality of electrically-powered sub-systems;
   receiving, by the power management system, a plurality of parameter sets for the sub-systems, wherein each of the parameter sets comprises:
      a first parameter indicting a priority of a respective sub-system relative to the other sub-systems,
      a second parameter indicating an amount of heat dissipated by the respective sub-system during operation, and
      a third parameter indicating a temperature requirement associated with the respective sub-system;
   controlling, by the power management system based on the sensor data and the parameter sets, a delivery of electrical power from the primary power source and the secondary power source to the environmental regulation system and the sub-systems; and
   controlling, by the power management system based on the sensor data and the parameter sets, a consumption of electrical power by the environmental regulation system and the sub-systems,
   wherein controlling the consumption of electrical power by the environmental regulation system and the sub-systems comprises:
      determining, based on the sensor data, an interruption of electrical power supplied by the primary power source;
      determining, based on the data, that electrical power supplied by the secondary power source is sufficient to operate the environmental regulation system; and
      responsive to determining the interruption of electrical power supplied by the primary power source and determining that electrical power supplied by the secondary power source is sufficient to operate the environmental regulation system, performing at least one of:

increasing a temperature setting of the environmental regulation system, or reducing a consumption of electrical power by a subset of the sub-systems.

2. The method of claim 1, wherein the subset of the sub-systems is selected based on the first parameters of each of the sub-systems.

3. A method comprising:

receiving, by a power management system, sensor data regarding an operation of a primary power source, a secondary power source, an environmental regulation system, and a plurality of electrically-powered sub-systems;

receiving, by the power management system, a plurality of parameter sets for the sub-systems, wherein each of the parameter sets comprises:

a first parameter indicting a priority of a respective sub-system relative to the other sub-systems, a second parameter indicating an amount of heat dissipated by the respective sub-system during operation, a third parameter indicating a temperature requirement associated with the respective sub-system, and at least one of:

a fourth parameter indicting a number of users of the respective sub-system, a fifth parameter indicating a location of the respective sub-system, or a sixth parameter indicating a type of service provided by the respective sub-system;

controlling, by the power management system based on the sensor data and the parameter sets, a delivery of electrical power from the primary power source and the secondary power source to the environmental regulation system and the sub-systems; and controlling, by the power management system based on the sensor data and the parameter sets, a consumption of electrical power by the environmental regulation system and the sub-systems.

4. The method of claim 3, wherein the primary power source is an electrical grid, and wherein the secondary power source comprises at least one of a standby power generation system or a battery.

5. The method of claim 3, wherein the environmental regulation system comprises a heating, ventilation and air conditioning (HVAC) system.

6. The method of claim 3, wherein controlling the consumption of electrical power by the environmental regulation system and the sub-systems comprises:

modifying a temperature setting of the environmental regulation system.

7. The method of claim 6, wherein modifying the temperature setting of the environmental regulation system comprises increasing the temperature setting of the environmental regulation system.

8. The method of claim 3, wherein controlling the consumption of electrical power by the environmental regulation system and the sub-systems comprises:

selecting a subset of the sub-systems; and reducing a consumption of electrical power by the subset of the sub-systems.

9. The method of claim 8, wherein reducing the consumption of electrical power by the subset of the sub-systems comprises switching off the subset of the sub-systems.

10. The method of claim 9, wherein the subset of the sub-systems is selected based on one of the first, the second, or the third parameters of each of the sub-systems.

11. The method of claim 8, wherein the subset of the sub-systems is selected based on a combination of the first, the second and the third parameters of each of the sub-systems.

12. The method of claim 3, wherein controlling the consumption of electrical power by the environmental regulation system and the sub-systems comprises:

determining, based on the sensor data, a malfunction in the environmental regulation system; and responsive to determining the malfunction in the environmental regulation system, reducing a consumption of electrical power by a subset of the sub-systems.

13. The method of claim 12, wherein the subset of the sub-systems is selected based on one of the first, the second, or the third parameters of each of the sub-systems.

14. The method of claim 12, wherein the subset of the sub-systems is selected based on a combination of the first, the second and the third parameters of each of the sub-systems.

15. The method of claim 3, wherein the sub-systems comprise at least one of:

one or more computer systems, or one or more telecommunications systems.

16. The method of claim 3, wherein the sensor data comprises at least one of:

an indication of an amount of electrical power provided by the primary power source, an indication of an amount of electrical power provided by the secondary power source, an amount of electrical power consumed by the environmental regulation system, or an amount of electrical power consumed by the plurality of electrically-powered sub-systems.

17. The method of claim 3, wherein the sensor data comprises an indication of a temperature of an environment of the sub-systems.

18. The method of claim 3, further comprising:

receiving, by the power management system from a computer system, a modification to at least one parameter set of the plurality of parameter sets, the modification being specified by a human operator; and controlling, by the power management system based on the modification, the consumption of electrical power by the environmental regulation system and the sub-systems.

19. The method of claim 3, further comprising:

receiving, by the power management system from a computer system, a command regarding an operation of the environmental regulation system and the sub-systems, the command being specified by a human operator; and controlling, by the power management system, the consumption of electrical power by the environmental regulation system and the sub-systems in accordance with the command.

20. A system comprising:

one or more processors; and one or more non-transitory computer readable media storing instructions that, when executed by the one or more processors, cause the one or more processors to perform operations comprising:

receiving sensor data regarding an operation of a primary power source, a secondary power source, an environmental regulation system, and a plurality of electrically-powered sub-systems;

receiving a plurality of parameter sets for the sub-systems, wherein each of the parameter sets comprises:
- a first parameter indicting a priority of a respective sub-system relative to the other sub-systems,
- a second parameter indicating an amount of heat dissipated by the respective sub-system,
- a third parameter indicating a temperature requirement associated with the respective sub-system, and
- at least one of:
  - a fourth parameter indicting a number of users of the respective sub-system,
  - a fifth parameter indicating a location of the respective sub-system, or
  - a sixth parameter indicating a type of service provided by the respective sub-system;

controlling, based on the sensor data and the parameter sets, a delivery of electrical power from the primary power source and the secondary power source to the environmental regulation system and the sub-systems, and controlling, based on the sensor data and the parameter sets, a consumption of electrical power by the environmental regulation system and the sub-systems.

21. One or more non-transitory computer readable media storing instructions that, when executed by one or more processors, cause the one or more processors to perform operations comprising:

receiving sensor data regarding an operation of a primary power source, a secondary power source, an environmental regulation system, and a plurality of electrically-powered sub-systems;

receiving a plurality of parameter sets for the sub-systems, wherein each of the parameter sets comprises:
- a first parameter indicting a priority of a respective sub-system relative to the other sub-systems,
- a second parameter indicating an amount of heat dissipated by the respective sub-system,
- a third parameter indicating a temperature requirement associated with the respective sub-system, and
- at least one of:
  - a fourth parameter indicting a number of users of the respective sub-system,
  - a fifth parameter indicating a location of the respective sub-system, or
  - a sixth parameter indicating a type of service provided by the respective sub-system;

controlling, based on the sensor data and the parameter sets, a delivery of electrical power from the primary power source and the secondary power source to the environmental regulation system and the sub-systems, and controlling, based on the sensor data and the parameter sets, a consumption of electrical power by the environmental regulation system and the sub-systems.

* * * * *